BIOLOGICAL SPECIMEN PROCESSING AND EMBEDDING APPARATUS
Original Filed May 1, 1968
FIGURE 2.
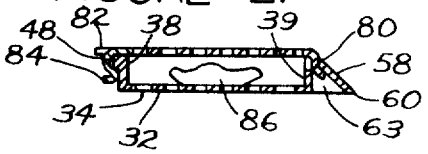
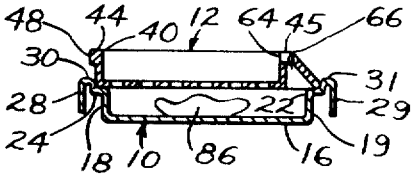
FIGURE 3.
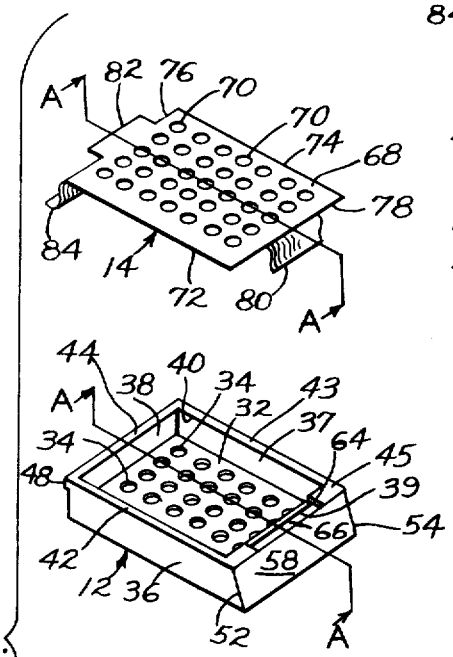
FIGURE 1.
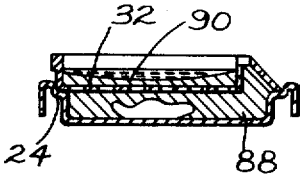
FIGURE 4.
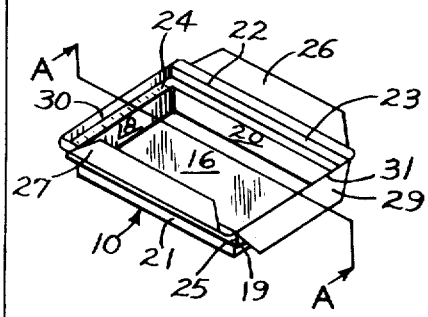
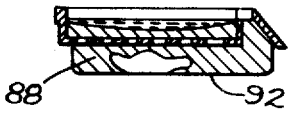
FIGURE 5.
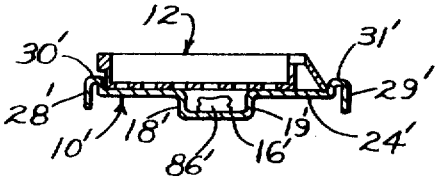
FIGURE 6.
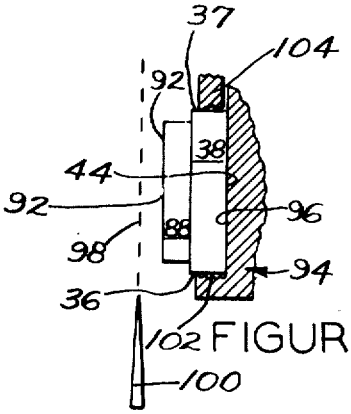
FIGURE 7.
INVENTOR
JAMES BENJAMIN MC CORMICK
BY Louis E. Davidson
ATTORNEY United States Patent Office Re. 28,165
Reissued Sept. 17, 1974

28,165

BIOLOGICAL SPECIMEN PROCESSING AND EMBEDDING APPARATUS

James Benjamin McCormick, Hinsdale, Ill., assignor to Miles Laboratories, Inc., Elkhart, Ind.

Original No. 3,674,396, dated July 4, 1972, Ser. No. 74,159, Sept. 21, 1970, which is a continuation of abandoned application Ser. No. 725,722, May 1, 1968. Application for reissue May 21, 1973, Ser. No. 361,973
Int. Cl. B29c *1/00, 1/02, 1/14*
U.S. Cl. 425—117 3 Claims

Matter enclosed in heavy brackets [ ] appears in the original patent but forms no part of this reissue specification; matter printed in italics indicates the additions made by reissue.

ABSTRACT OF THE DISCLOSURE

A combination capsule and mold apparatus and treatment of a biological specimen by the use thereof is described wherein a biological specimen can be placed inside a capsule comprising an open-topped box-like open mold having a perforated bottom wall and a removable perforated cover. After the specimen has been processed inside the capsule with desired fluids, the cover is removed from the capsule to form an open mold, the specimen is transferred from the open mold to an open-topped box-like base mold, and the open mold is placed in coupled relation over the base mold. Molten paraffin is then poured through the open mold into the base mold. After the paraffin hardens, the open mold and the rigidly attached paraffin body containing the specimen are separated from the base mold, and the open mold is mounted in the holder of a microtome for subsequent slicing of the paraffin-embedded specimen.

This application is a continuation of application Ser. No. 725,722, filed on May 1, 1968, now abandoned.

BACKGROUND AND PRIOR ART

It is well known in the art that biological tissues can be sliced into thin sections on a microtome for subsequent microscopic examination by a pathologist, for example. In order to obtain a satisfactory thin section wherein the tissue is not distorted, the tissue must be substantially rigid at the time of microtome slicing. One commonly employed procedure of providing this rigidity is to embed the tissue in hardened paraffin.

In order to properly use the paraffin, the tissue must first be processed with several fluids to dehydrate the tissue, to clear the tissue with a suitable oil and to infiltrate the tissue with a paraffin wax or a combination of wax and resinous material. This processing has been conveniently carried out by placing the specimen in a fluid-permeable capsule and successively submerging the capsule in the necessary fluids. The resulting processed specimen is then removed from the capsule and embedded in a block of paraffin wax for subsequent mounting in a microtome for slicing. The capsule can be reused for processing specimens.

Various apparatus have been employed in the prior art for embedding the specimens in paraffin. Most of such apparatus were crude and resulted in embedded specimens having many disadvantages. The apparatus of U.S. Pat. No. 2,996,762 provided a substantial improvement in embedding apparatus. This improvement comprised an embedding box which resulted in a unitary structure of paraffin block and box designed for easy and accurate clamping in a holder on a microtome. While the apparatus of U.S. Pat. No. 2,996,762 had many advantages, it still required a separate capsule apparatus for processing the specimen prior to the paraffin embedding step.

OBJECTS AND SUMMARY OF THE INVENTION

It is an object of the present invention to provide improved apparatus for embedding a specimen in paraffin which can also be used to mount the specimen in a microtome.

It is another object of the present invention to provide combination apparatus which can be used both to process the specimen prior to embedding and to embed the specimen in paraffin.

In accordance with the present invention, a combination capsule and mold apparatus useful in the processing, paraffin embedding, and slicing of biological specimens is provided which comprises an open-topped box-like base mold having a bottom wall, an open-topped box-like open mold member capable of placement in coupled relation on the open top of said base mold, said open mold having a perforated bottom wall, and a removable cover for said open mold, said open mold with the removable cover in place providing a fluid-permeable capsule in which a biological specimen can be treated with selected fluid, said base mold being capable of accommodating a treated specimen transferred thereto from said capsule, placement of said molds in said coupled relation while a specimen is disposed within said base mold permitting said base mold to be filled with molten paraffin poured thereinto through said open mold with said cover removed until said paraffin extends above the perforated bottom wall of said open mold, said base mold defining the shape of the paraffin body when hardened having a specimen-embedded face along the bottom wall of the base mold, and the perforated bottom wall of said open mold affording means for anchoring said paraffin body to said open mold such that on removal of said base mold from said coupled relation said open mold and paraffin body remain as a finished unit capable of being mounted in a specimen holder of a microtome.

DESCRIPTION OF THE DRAWINGS

FIG. 1 is a perspective view of the separate parts of the combination capsule and mold apparatus in exploded relation;

FIG. 2 is a cross-sectional view taken generally along plane A—A of FIG. 1 showing the capsule formed from the cover and open mold member, said capsule containing a biological specimen;

FIG. 3 is a cross-sectional view taken generally along plane A—A of FIG. 1 showing the open mold member with the cover removed and said open mold member fitted over the base mold, said base mold containing a biological specimen;

FIG. 4 is a similar view to FIG. 3 showing the open mold member and base mold containing embedding paraffin;

FIG. 5 is a similar view to FIG. 4 with the base mold removed;

FIG. 6 is a similar view to FIG. 3 showing the use of a base mold having a smaller storage area to accommodate a smaller specimen as shown; and FIG. 7 is a side view in partial cross-section showing the unitary structure of FIG. 5 supported in a microtome specimen holder.

DESCRIPTION OF THE INVENTION

Referring to FIGS. 1 to 3, the apparatus of the present invention comprises a base mold 10, a multi-purpose capsule and open mold member 12, and a removable cover 14. Base mold 10 is formed in a generally open-topped box-like rectangular shape with a substantially flat bottom wall 16, transverse sidewalls 18 and 19, longitudinal sidewalls 20 and 21 and an open top 22. The upper positions of the sidewalls 18 to 21 are offset outwardly to form an annular horizontal surface or ledge 24 within the open top 22 which is substantially parallel to bottom wall 16. Longitudinal lip walls 23 and 25 extend upwardly and horizontally outwardly from the upper edges of the longitudinal sidewalls 20 and 21 and connect said sidewalls with upstanding longitudinal fins 26 and 27 respectively. Transverse lips walls 30 and 31 extend upwardly and horizontally outwardly from the upper edges of the transverse sidewalls 18 and 19 and connect said sidewalls with downturned transverse fins 28 and 29 respectively. This latter feature is best shown in FIG. 3. Base mold 10 is preferably former from metal or other suitable material having a relatively high coefficient of heat transmission.

Referring to FIGS. 1, 2 and 3, the multi-purpose capsule and open mold member 12 is formed in a generally open-topped box-like rectangular shape with a bottom wall 32 having a plurality of perforations 34, longitudinal sidewalls 36 and 37, transverse sidewalls 38 and 39, and an open top 40. Sidewalls 36, 37, 38 and 39 have coplanar upper edge surfaces 42, 43, 44 and 45, respectively, which are normal to said sidewalls and which form a substantially flat annular end surface defining the open top 40.

The outer face of the transverse sidewall 38 is formed along its upper edge with an outwardly projecting ridge 48. Connected to and extending downwardly and outwardly from the upper edge portion of the transverse sidewall 39 is a slanted wall 58, and the adjacent end portions of the longitudinal sidewalls 36 and 37 extend outwardly beyond the transverse sidewall 39 to join the slanted wall 58 along slant edges 52 and 54 respectively. The upper edge portions of the transverse sidewall 39 and of the slanted wall 58 are cut away as at 64 to form a transverse slot 66 which affords access to the transverse chamber 63 of generally triangular cross-section which is formed between the outer face of sidewall 39 and the underside of the slanted wall 58. Capsule member 12 is preferably formed from an organo-plastic or other suitable material having a lower coefficient of heat transmission than that of the base mold 10.

Referring to FIG. 1, removable cover 14 is formed of a generally rectangular flat plate 68 which preferably has a plurality of perforations 70 therein. Plate 68 has longitudinal edges 72 and 74 and transverse edges 76 and 78. A tongue portion 80 extends downwardly and outwardly from the mid portion of the edge 78 and a tab or handle portion 82 extends from the mid portion of the edge 76 coplanar with the plate 68. At each side of the tab portion 82 a spring latch member 84 having a generally S-shaped cross-section, as viewed in FIGS. 1 and 2, is attached to edge 76 and extends downwardly in a direction generally normal to plate 68. Cover 14 is preferably formed from metal, but other suitable materials, such as organo-plastics, can also be used.

In order to utilize this novel apparatus, a biological specimen 86 is placed within the member 12 as shown in FIG. 2. The cover 14 is then fitted over the open top 40 of member 12 by inserting the tongue 80 through the slot 66 and snapping the latch members 84 over ridge 48 as shown in FIG. 2 to close the capsule. The cross-sectional dimensions of the perforations 34 in the bottom wall 32 and of the perforations 70 in the cover plate 68 are both smaller than any corresponding dimension of the specimen 86, so that the specimen will be retained within the so-formed capsule. The fluid-permeable capsule containing the specimen can then be successively placed in solutions of dehydrating agents, clearing agents and paraffin wax to properly prepare the specimen for subsequent embedding in paraffin. The processing fluids easily pass through the perforations 34 and 70.

The cover 14 is then removed from the capsule member 12 by lifting up on handle 82. Specimen 86 is then removed from member 12 and placed in the base mold 10 as shown in FIG. 3. The specimen is oriented so that the portion of the specimen to be ultimately sliced first in a microtome is in contact with the bottom wall 16. A small amount of molten paraffin can then be poured into the base mold 10 to harden around specimen 86 and maintain the desired orientation thereof with respect to the bottom wall 16.

The open mold member 12 is then placed on the base mold 10 in nested or coupled relation therewith as shown in FIG. 3. In this position the member 12 rests on the annular horizontal surface 24 with the outer surfaces of the sidewalls 36, 37 and 38 of said member 12 substantially in abutment with the inner surfaces of the lip walls 25, 23 and 30 respectively. The lower edge 60 of slanted wall 58 is substantially in abutment with lip wall 31. The member 12 is thus retained in the proper position. The flat annular upper surface of mold member 12 formed by coplanar upper edge surfaces 42, 43, 44 and 45 is then substantially parallel to the bottom wall 16 of the base mold 10.

Hot molten paraffin is then poured through perforations 34 of the open mold member 12 into base mold 10 until the base mold 10 and substantially all of the mold member 12 are filled with paraffin. Since the base mold preferably has a coefficient of heat transmission greater than that of the open mold member, heat from the paraffin is dissipated through the bottom and sidewalls of the base mold 10 more rapidly than through the sidewalls of the open mold member 12 with the result that the paraffin initially solidifies against the inner surfaces of the base mold 10. The shrinkage of the paraffin when cooling also moves toward the base mold. When the entire paraffin body 88 has hardened, it has the structure shown in cross-section in FIG. 4 including an upper shrinkage meniscus 90. It will be observed that the perforated bottom wall 32 of the open mold member 12 is embedded in the solidified paraffin body 88 so that the open mold member 12 is rigidly anchored to the finished paraffin body 88 to form a finished unit. The bottom and sidewalls of the base mold 10 serve to define the shape of the finished paraffin body 88 when hardened with the specimen oriented along the base mold bottom wall 16. The apparatus of the present invention requires about 20–30 weight percent less paraffin to embed a given size specimen than the apparatus of U.S. Pat. No. 2,996,762.

The fins 26, 27, 28 and 29 extending from the periphery of the open top of the base mold 10 aid in conducting heat away from the contact interfaces between the open mold member 12 and the base mold 10.

Base mold 10 can then be easily removed from the finished paraffin body 88 to form the finished unit shown in cross-section in FIG. 5 having a specimen embedded face 92. The upper surface of member 12 is parallel with face 92. This finished unit can then be easily mounted in the specimen holder of a microtome as shown in partial cross-section in FIG. 7. The specimen holder 94, which is either an integral part of the microtome or is supported by the microtome, has a substantially flat aligning face 96 which is in a plane parallel to the path of travel 98 of a microtome blade 100 which has a reciprocal motion with respect to the specimen holder. The specimen holder 94 also has a stationary gripping means 102 and a movable gripping means 104 both having gripping faces normal to face 96.

The mold member portion of the finished unit is placed into the specimen holder 94 with the annular end surface of the open mold member, defined by edge surfaces 42 to 45, seated against the flat aligning face 96 of holder 94. Sidewall 36 is placed in contact with stationary gripping means 192 and movable gripping means 104 is suitably locked into gripping contact with sidewall 37. The finished unit is thus rigidly supported in holder 94 with the specimen-embedded face 92 thereof disposed in a plane parallel with the path of travel 98 of the microtome blade 100. This physical relationship between the specimen-embedded face 92 and the blade motion along path 98 is desirable in order to obtain specimen slices of uniform thickness. In practice the microtome holder 94 would be moved to the left, as viewed in FIG. 7, until the face 92 was over blade 100. The blade 100 would then be moved upward, as viewed in FIG. 7, relative to paraffin body 88 to cut a slice from the specimen-embedded in body 88.

After the desired slice or slices have been cut from the specimen, the finished unit can be removed from the holder 94 for storage. Since the annular end face of the open mold member 12 is parallel to the face 92 of the specimen-embedded paraffin body 88, whenever additional slices are subsequently to be made, the repositioning of the member 12 against the aligning face 96 of the holder 94 will again place the face 92 in a plane parallel to the microtome blade motion.

In a laboratory handling a large number of specimens, it is necessary that proper specimen identification be maintained. The apparatus of the present invention employs slanted wall 58 for this purpose. Wall 58 has a surface that can be easily written upon with pencil or pen for the application of an identification designation. This enables the specimen to be continuously identified through processing, embedding and slicing.

The base mold shown in FIGS. 1, 3 and 4 is intended primarily for specimens having a fairly large size. If this particular base mold were used with a fairly small specimen, an excessive amount of paraffin would be needed to embed the specimen. The base mold 10' shown in cross-section in FIG. 6 has a relatively small volume chamber formed by bottom wall 16' and sidewalls, such as 18' and 19', which has a size not substantially larger than necessary to accommodate the small specimen 86'. Base molds having a variety of chamber sizes can be used in the apparatus of this invention. Except for the chamber sizes, however, the dimensions of the base molds 10' of FIG. 6 are the same as those for the base mold 10 in FIGS. 1, 3 and 4 so that the same sized open mold member 12 can be employed therewith. Since the finished mold-paraffin units are generally stored for future reference after specimen slices are made, it is preferable to employ open mold members 12 having the same size for all specimens, because this simplifies the storage and retrieval of the units.

In summary, this invention relates to an improved apparatus combination that can be used to process biological specimens, embed such specimens in paraffin and support the embedded specimens in a microtome for subsequent slicing.

I claim:

1. Combination capsule and mold apparatus useful in the processing, paraffin embedding, and slicing of biological specimens which comprises (1) an open-topped rectangular shaped base mold having four sidewalls and a flat imperforate bottom wall, each of said sidewalls having an extending fin wherein two of the opposing sidewalls have fins extending in an upward direction from the open top of the base mold and the two remaining opposing sidewalls have fins extending in a downward direction from the open top of the base mold, (2) an open-topped rectangular shaped open mold member having a perforated bottom wall, first and second opposing transverse sidewalls, third and fourth opposing longitudinal sidewalls, said transverse and longitudinal sidewalls having coplanar flat upper surfaces, said open mold member having a slanted wall with an exterior surface capable of being easily written upon extending downwardly and outwardly from the flat upper surface of the first transverse sidewall, the third and fourth longitudinal sidewalls extending beyond said first transverse sidewall to join said slanted wall to form a transverse chamber between said first transverse sidewall, said slanted wall and said extensions of said third and fourth longitudinal sidewalls, said open mold member also having a transverse slot located along the junction between the slanted wall and the flat [supper] *upper* surface of the first transverse sidewall, said transverse slot providing upper access to said transverse chamber, said open mold member further having an outwardly projecting ridge along the outer surface of the second transverse sidewall and communicating with the upper flat surface of said sidewall, and (3) a removable cover for said open mold member, said removable cover formed of a perforated rectangular flat plate with a tongue portion extending downwardly and outwardly from the mid portion of one transverse edge of said plate, a tab extending from the mid portion of the opposing transverse edge of said plate coplanar with said plate, and a spring latch member located at the side of said tab and extending downwardly from said transverse edge of said plate, said cover capable of being removably attached to said open mold member with the tongue portion of said cover inserted through the transverse slot of said open mold member and the spring latch member of said cover placed over the outwardly projecting ridge of said open mold member, said open mold member with the removable cover in place and being free of the base mold providing a fluid-permeable capsule in which a biological specimen can be treated with selected fluid, said bottom wall of the open mold member and said removable cover both having a plurality of perforations the cross-sectional dimensions of which are smaller than any corresponding dimensions of a specimen to be processed in said apparatus, said base mold being capable of accommodating a treated specimen transferred thereto from said capsule, said open mold member with said cover removed being capable of placement in coupled relation on the top of said base mold while a specimen is disposed within said base mold wherein said coplanar flat upper surfaces of said open mold member are parallel with said flat bottom wall of said base mold, said coupled relation permitting said base mold to be filled with molten paraffin poured thereinto through said open mold member with said cover removed until said paraffin extends above the perforated bottom wall of said open mold member, said base mold defining the shape of the paraffin body when hardened having a specimen-embedded face along the bottom wall of the base mold and the perforated bottom wall of said open mold member affording means for anchoring said paraffin body to said open mold member such that on removal of said base mold from said coupled relation said open mold member and paraffin body remain as a finished unit capable of being mounted in a specimen holder for a microtome, said coplanar flat upper surfaces of said open mold member capable of being employed as alignment means for properly positioning said finished unit in said microtome.

*2. Combination capsule and mold apparatus useful in the processing, paraffin embedding, and slicing of biological specimens which comprises, (1) an open-topped rectangular shaped base mold having four sidewalls and a flat imperforate bottom wall, each of said sidewalls having and extending fin wherein two of the opposing sidewalls have fins extending in an upward direction from the open top of the base mold and the two remaining opposing sidewalls have fins extending in a downward direction from the open top of the base mold, (2) an open-topped rectangular shaped open mold member having a perforated bottom wall, first and second opposing transverse sidewalls, third and fourth opposing longitudinal sidewalls, said transverse and longitudinal sidewalls having coplanar flat upper surfaces, said open mold member having a slanted wall with an exterior surface capable of being easily written upon extending downwardly and outwardly from the flat upper surface of the first transverse sidewall, the third and fourth longitudinal sidewalls extending beyond said first transverse sidewall to join said slanted wall to form a transverse chamber between said first transverse sidewall, said slanted wall and said extensions of said third and fourth longitudinal sidewalls,*

*said open mold member also having a transverse slot located along the junction between the slanted wall and the flat upper surface of the first transverse sidewall, said transverse slot providing upper access to said transverse chamber, and (3) a removable cover for said open mold member, said removable cover formed of a perforated rectangular flat plate with a tongue portion extending downwardly from said plate, said cover capable of being removably attached to said open mold member with the tongue portion of said cover mating against said open mold member, said open mold member with the removable cover in place and being free of the base mold providing a fluid-permeable capsule in which a biological specimen can be treated with selected fluid, said bottom wall of the open mold member and said removable cover both having a plurality of performations the cross-sectional dimensions of which are smaller than any corresponding dimensions of a specimen to be processed in said apparatus, said base mold being capable of accommodating a treated specimen transferred thereto from said capsule, said open mold member with said cover removed being capable of placement in coupled relation on the top of said base mold while a specimen is disposed within said base mold wherein said coplanar flat upper surfaces of said open mold member are parallel with said flat bottom wall of said base mold, said coupled relation permitting said base mold to be filled with molten paraffin poured thereinto through said open mold member with said cover removed until said paraffin extends above the perforated bottom wall of said open mold member, said base mold defining the shape of the paraffin*

*body when hardened having a specimen-embedded face along the bottom wall of the base mold and the perforated bottom wall of said open mold member affording means for anchoring said paraffin body to said open mold member such that on removal of said base mold from said coupled relation said open mold member and paraffin body remain as a finished unit capable of being mounted in a specimen holder for a microtome, said coplanar flat upper surfaces of said open mold member capable of being employed as alignment means for properly positioning said finished unit in said microtome.*

*3. Apparatus according to Claim 2 wherein said cover is capable of being removably attached to said open mold member with the tongue portion of said cover inserted through the transverse slot of said open mold member.*

References Cited

The following references, cited by the Examiner, are of record in the patented file of this patent or the original patent.

UNITED STATES PATENTS

| | | | |
|---|---|---|---|
| 2,996,762 | 8/1961 | McCormick | 425—117 X |
| 3,411,185 | 11/1968 | Pickett | 425—117 |
| 3,456,300 | 7/1969 | Pickett | 425—117 |

J. HOWARD FLINT, Jr., Primary Examiner

U.S. Cl. X.R.

425—84, 185, 470; 249—160; 128—2